Oct. 16, 1951 W. M. MILLER 2,571,469
COMBINE MACHINE
Filed Jan. 14, 1948 4 Sheets-Sheet 1
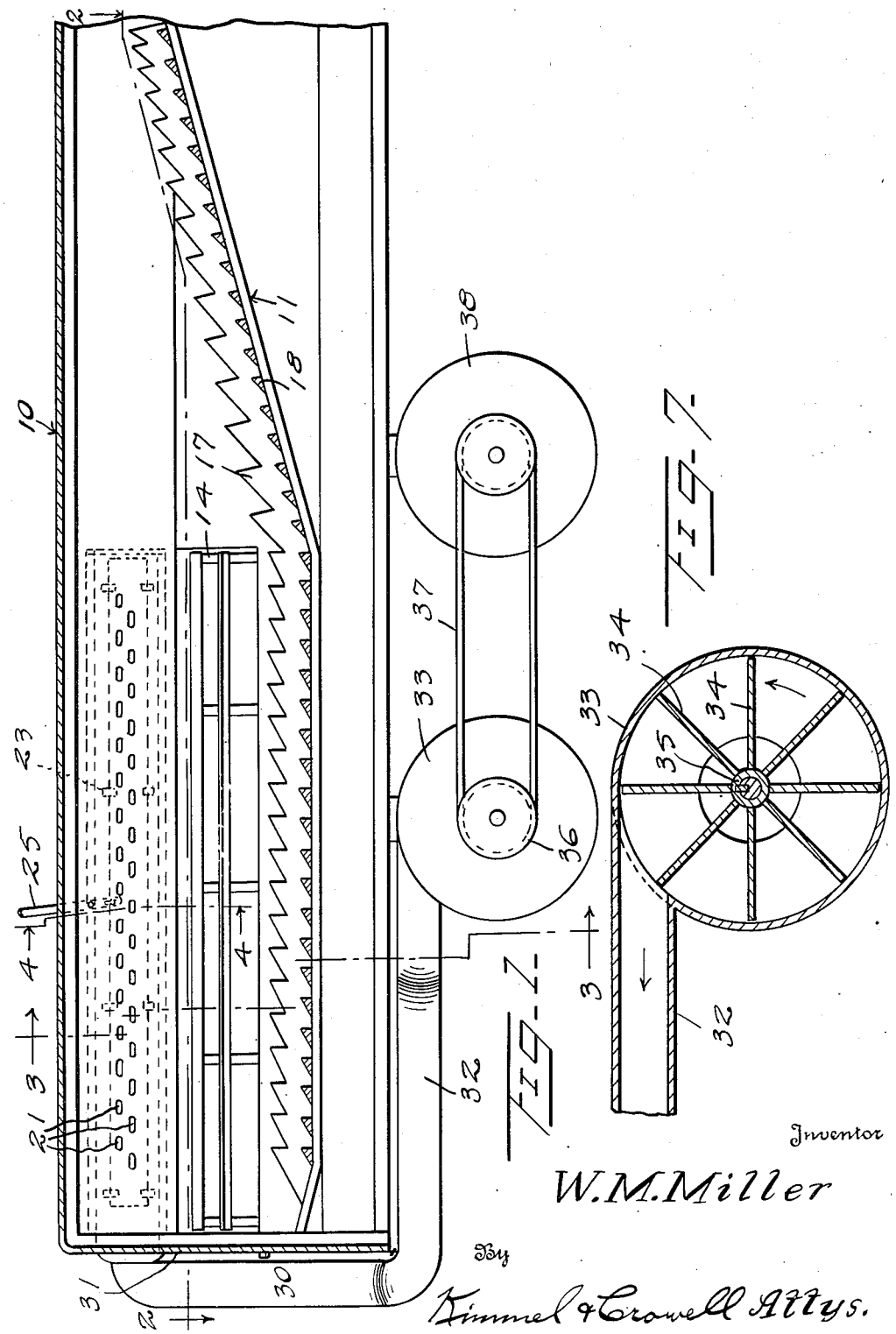
Inventor
W. M. Miller
By
Kimmel & Crowell Attys.

Oct. 16, 1951     W. M. MILLER     2,571,469
COMBINE MACHINE
Filed Jan. 14, 1948     4 Sheets-Sheet 2
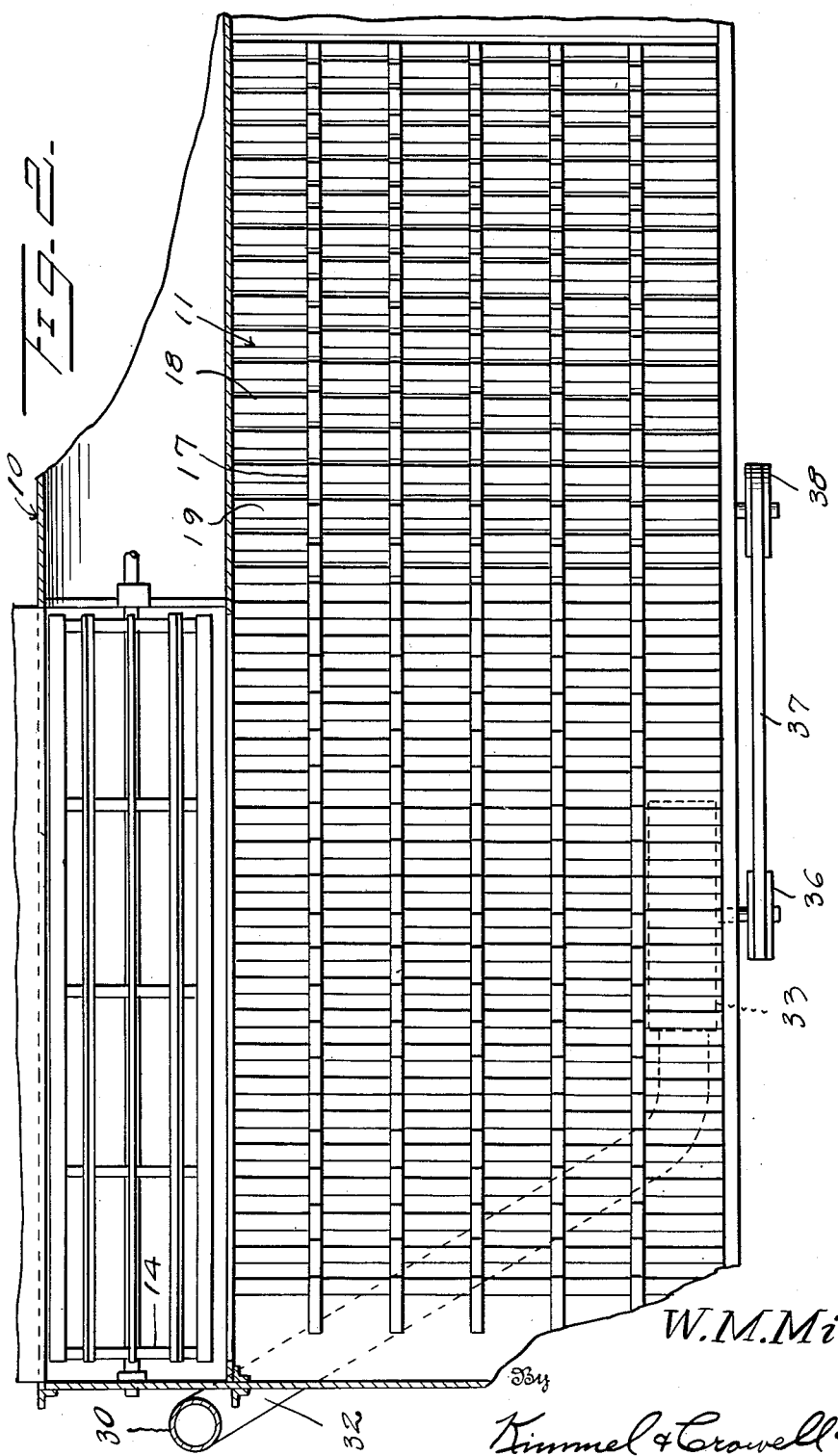

Oct. 16, 1951 — W. M. MILLER — 2,571,469
COMBINE MACHINE
Filed Jan. 14, 1948 — 4 Sheets-Sheet 3
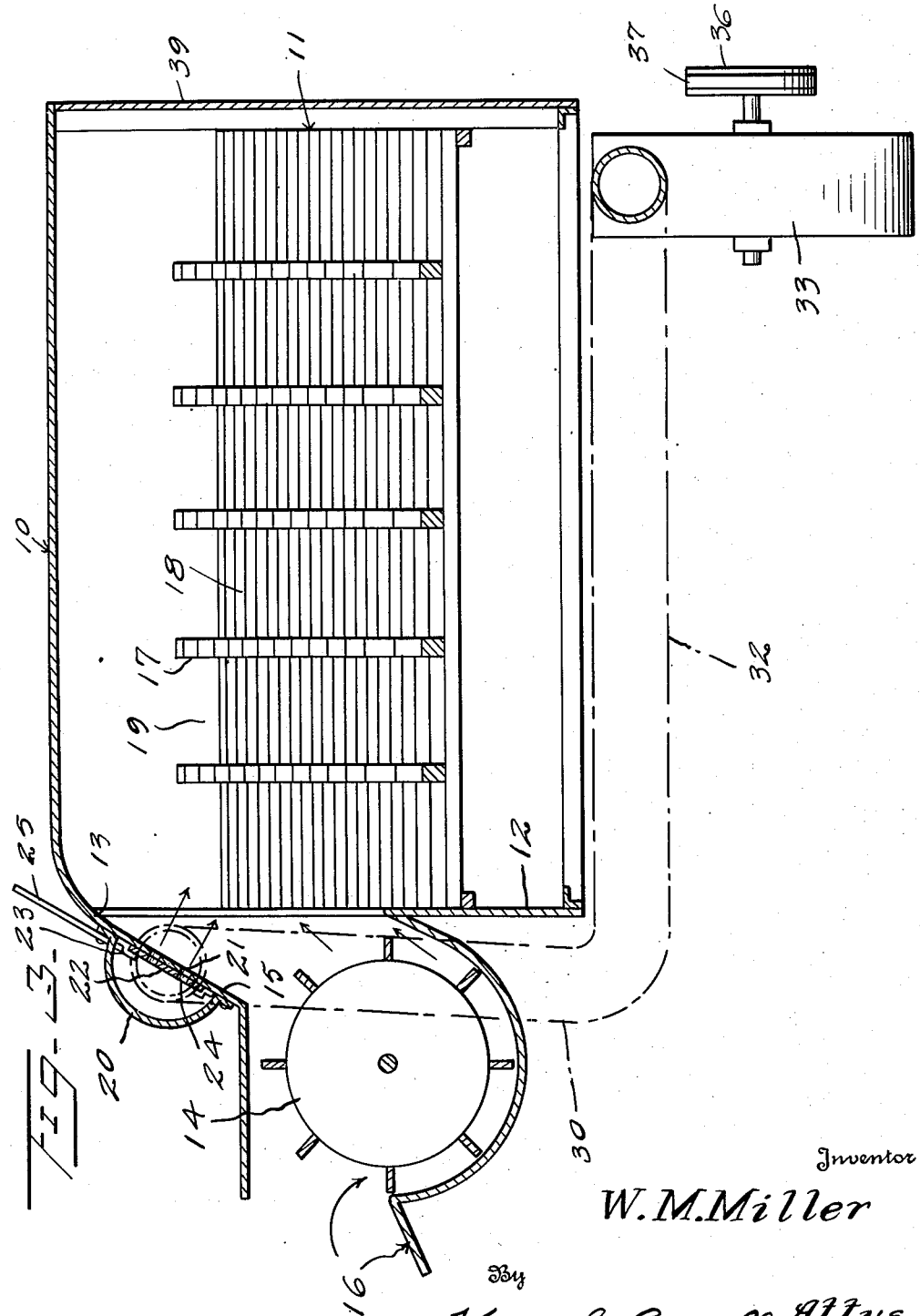
Inventor
W. M. Miller
By Kimmel & Crowell Attys.

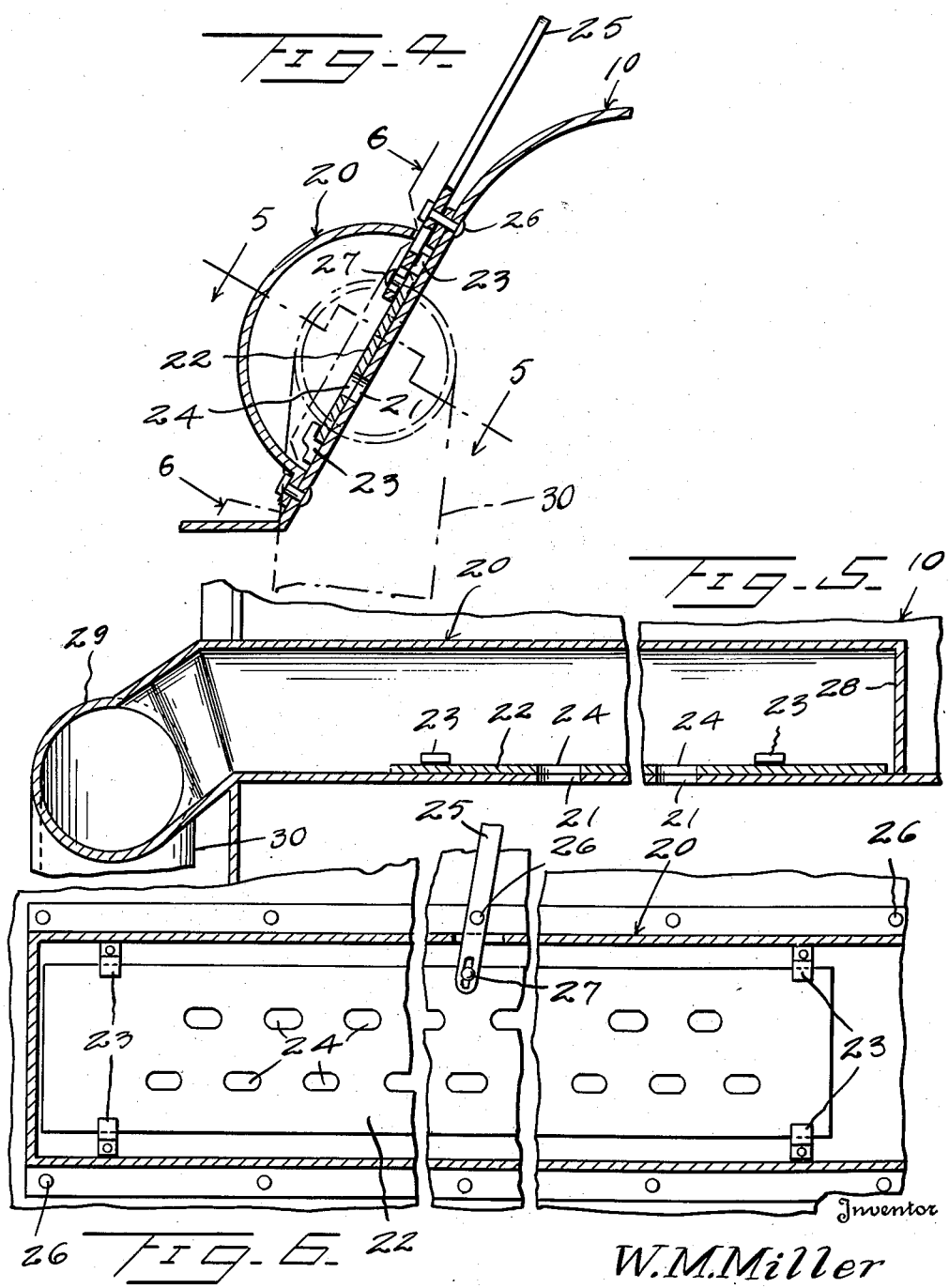

Patented Oct. 16, 1951

2,571,469

UNITED STATES PATENT OFFICE 2,571,469

COMBINE MACHINE

William M. Miller, Junction City, Oreg.

Application January 14, 1948, Serial No. 2,231

2 Claims. (Cl. 130—27)

This invention relates to a harvester thresher of the type shown in Patent No. 2,123,879, dated July 19, 1938.

In harvesters and threshers or combines, there has been considerable difficulty and annoyance by reason of the uneven discharge and piling up of straw close to the threshing cylinder on the threshing or separating rack. This is particularly true where the straw is heavy or the ground is uneven.

The straw piles up because the straw drops down on the spinning cylinder, wrapping around it and thus causing the straw that falls to pile up and to slug the machine. The great difficulty it seems, is that when the straw is forced up by the cylinder that it goes above the cylinder and unless there is a means of throwing it back that it will drop down again upon the cylinder and wrap around it causing the cylinder to become slugged and thus stopping the operation. The air forcing in causes the straw to be thrown back and away from the cylinder so that when it drops it does not drop vertically downward but back toward the back side of the housing and to where the rack is located.

It is, therefore, an object of this invention to provide means correlated with the threshing cylinder and the threshing rack whereby the straw will not clog up and in addition the straw delivered to the rack by the cylinder will be evenly distributed across the rack to thereby effect a more thorough use of the entire width of the rack and provide for a more thorough separation of the grains from the straw.

Another object of this invention is to provide in a combine, means discharging an air stream over the receiving end of the threshing rack which flows laterally across the rack in the direction of the straw discharged from the cylinder so as to carry a substantial portion of the straw to the far side of the rack and in this manner evenly distribute the straw over the rack.

A further object of this invention is to provide a distributing means of this kind which includes a regulating valve whereby the volume of air may be accurately controlled to effect the desired even distribution of the straw over the rack and the elimination of bunching or clogging of the straw at the intake side of the rack housing.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary vertical section taken longitudinally through the separating or threshing portion of a combine including an attachment constructed according to an embodiment of this invention.

Figure 2 is a horizontal section taken substantially on the line 2—2 of Figure 1.

Figure 3 is a fragmentary sectional view taken on the line 3—3 of Figure 1.

Figure 4 is a fragmentary sectional view taken on the line 4—4 of Figure 1.

Figure 5 is a fragmentary sectional view taken on the line 5—5 of Figure 4.

Figure 6 is a fragmentary sectional view taken on the line 6—6 of Figure 4.

Figure 7 is a vertical section of the supplemental blower or fan associated with this invention.

Referring to the drawings, the numeral 10 designates generally a housing which encloses a conventional threshing or sifting means, generally designated as 11. The housing 10 is formed on one wall 12 thereof with an opening 13 comprising an intake opening wherein the combined straw and grain are adapted to be discharged by means of a rotary cylinder or drum 14.

The constuction hereinbefore described is similar to that shown in Patent No. 2,123,879, supra, and is here shown as one type of combine with which this invention may be combined.

The housing 10 includes a downwardly and laterally projecting wall 15 which extends upwardly and inwardly from the drum 14. The drum 14 is adapted to rotate in a counterclockwise direction and forces the material from the conveyor housing 16 into the interior of the housing 10. The screen or separating means 11 also includes a plurality of longitudinally disposed toothed bars 17 which extend upwardly from the screen bars 18 and which are adapted to provide separate channels 19 within which the straw is adapted to move during the agitation or oscillation of the threshing structure 11.

In threshers or combines as hereinbefore described there is a tendency for the incoming straw and grain to clog up adjacent the intake opening 13 so that the material will not be scattered over the surface of the threshing means 11. In order to provide a means whereby the incoming straw and grain will be more evenly spread over the intake end of the threshing means 11, I have provided a housing 20 which is secured to the outer side of the inclined wall 15. The wall 15 is formed with a plurality of spaced openings 21 and a valve plate 22 is slidable in guides 23 and is formed with openings 24 which may be moved into complete or partial registry with the openings 21.

A valve operating lever 25 is pivotally mounted on a pivot 26 and is pivotally connected to a pivot member 27 which is secured to the valve plate 22. One end of the housing 20 is closed by means of a wall 28 and the other end of the housing 20 is connected to a pipe 29 which is extended downwardly as indicated at 30 along the end wall 31 of housing 10. The pipe 30 is connected to a horizontal pipe 32 and the latter is connected to the discharge side of a fan housing 33. The fan housing 33 has rotatable therein blades 34 mounted on a shaft 35 and the shaft 35 has a pulley 36 thereon which is operatively connected by means of a belt 37 to the blower 38 conventionally used with the combine. In this manner the rotation of blower 38 will also provide for operation of the fan embodying the housing 33 and the blades 34.

In the use and operation of this combine the housing 10 may be formed with the air openings 21 and the housing 20 is secured to the outer side of the wall 15. The openings 21 are of such size and number that when the valve plate 22 is in completely open position with the openings 24 therein registering completely with openings 21 the area of the openings 21 will be equivalent to the full capacity of the fan. The air discharged from housing 20 through the openings 21 will be directed downwardly and inwardly toward the opposite side wall 39 of housing 10 and this air will carry therewith a substantial amount of straw and grain so that this straw and grain will be substantially evenly spaced in the channels 19 between the toothed bars 17. By providing the sliding or adjustable valve plate 22, the spread of the straw and grain on the intake end of the threshing structure 11 can be very accurately regulated so that the straw will be evenly spread irrespective of the character of the grain. This device may be made as an attachment for combines at present in use, particularly of the character embodied in Patent No. 2,123,879, supra.

I claim:

1. In combination, a thresher having an elongated separator housing formed with a closed end, an oscillating separating means extending from adjacent said closed end within said housing, an elongated intake opening formed in said housing adjacent said closed end and disposed to one side of and above said separating means, a discharge means in communication with said opening, said discharge means having an elongated rotary drum disposed parallel to said opening, for discharging grain and straw therethrough, a plurality of air inlet openings formed in said housing above and rearwardly of said elongated opening and spaced parallel thereto, an air supply duct disposed over said openings and extending lengthwise of said drum, above and adjacent thereto from said closed end and communicating with said inlet openings, and fan means supplying air to said duct adjacent said one end to blow grain and straw discharged into the housing across the separating means.

2. In combination, a thresher having an elongated separator housing in which are mounted longitudinally extending separating means, said housing having a closed end, a discharge drum rotatable at one side of the housing and extending from adjacent said closed end, an elongated opening extending longitudinally and along said one side of the housing and communicating with said drum for discharging grain and straw therethrough onto the separating means, a plurality of openings formed in said separator housing at said one side in spaced parallel relation to said elongated opening, said plurality of openings being disposed above and adjacent said separating means, an air duct extending lengthwise of said drum in communication with said plurality of openings, fan means supplying air to said duct adjacent said closed end of the housing, and a longitudinally adjustable valve plate disposed over said plurality of openings having spaced apertures for registry therewith.

WILLIAM M. MILLER.

REFERENCES CITED

The following references are of record in the file of this patent:

UNITED STATES PATENTS

| Number | Name | Date |
|---|---|---|
| 796,117 | Dunckelberger | Aug. 1, 1905 |
| 917,536 | McIntire | July 11, 1933 |
| 2,262,453 | Dray | Nov. 11, 1941 |
| 2,303,200 | Dray | Nov. 24, 1942 |

FOREIGN PATENTS

| Number | Country | Date |
|---|---|---|
| 116,171 | Australia | Dec. 3, 1942 |